US008342353B2

(12) United States Patent
Bartlett

(10) Patent No.: US 8,342,353 B2
(45) Date of Patent: Jan. 1, 2013

(54) INTERLOCK VESSEL FOR HYPERBARIC TRANSFER SYSTEM

(76) Inventor: Robert D. Bartlett, New Orleans, LA (US)

( * ) Notice: Subject to any disclaimer, the term of this patent is extended or adjusted under 35 U.S.C. 154(b) by 1539 days.

(21) Appl. No.: 11/893,174

(22) Filed: Aug. 15, 2007

(65) Prior Publication Data

US 2008/0172944 A1 Jul. 24, 2008

Related U.S. Application Data

(63) Continuation-in-part of application No. 11/626,648, filed on Jan. 24, 2007, now abandoned.

(51) Int. Cl.

| | |
|---|---|
| ***B65D 51/04*** | (2006.01) |
| *E06B 7/00* | (2006.01) |
| *F16K 24/00* | (2006.01) |

(52) U.S. Cl. ..................... 220/254.5; 220/846; 137/585; 49/68; 128/205.26

(58) Field of Classification Search ............... 220/254.5, 220/203.05, 203.07, 324, 360, 367.1, 848, 220/845, 846; 49/68; 128/205.26; 292/256.5, 292/DIG. 30; 251/95; 137/584, 585
See application file for complete search history.

(56) References Cited

U.S. PATENT DOCUMENTS

| | | | | |
|---|---|---|---|---|
| 2,926,012 | A * | 2/1960 | Maher | 49/68 |
| 3,136,007 | A * | 6/1964 | Maher et al. | 49/68 |
| 3,655,090 | A | 4/1972 | Rothrock et al. | |
| 3,721,363 | A | 3/1973 | Bressler et al. | |
| 5,060,644 | A | 10/1991 | Loori | |
| 5,360,001 | A | 11/1994 | Brill et al. | |
| 6,352,078 | B1 | 3/2002 | Harvey et al. | |
| 6,443,148 | B1 | 9/2002 | Rodocker | |
| 6,568,554 | B2 * | 5/2003 | Booth et al. | 220/316 |
| 6,708,837 | B2 * | 3/2004 | Smith | 220/316 |
| 7,036,674 | B2 | 5/2006 | McGuire | |
| 2010/0037892 | A1 * | 2/2010 | Bartlett | 128/202.12 |

* cited by examiner

*Primary Examiner* — Robin Hylton

(74) *Attorney, Agent, or Firm* — Garvey, Smith, Nehrbass & North, L.L.C.; Brett A. North

(57) ABSTRACT

An interlock vessel has an air-tight body having open opposing ends. A portion of the body is designed to fit into a decompression (hyperbaric) chamber, wherein a diver or a patient undergoing a decompression treatment is positioned. The opposing ends are closed by pivotally moveable doors and latching assemblies that retain the door in a closed position until the pressure inside the decompression chamber and the exterior of the chamber is equalized. Both latching assemblies are manually operated.

48 Claims, 15 Drawing Sheets

INTERLOCK VESSEL FOR HYPERBARIC TRANSFER SYSTEM

CROSS-REFERENCE TO RELATED APPLICATIONS

This application is a continuation-in-part of my application Ser. No. 11/626,648 filed on Jan. 24, 2007 now abandoned entitled “Improved Air Lock for Pressure Vessels for Human Occupancy,” the full disclosure of which is incorporated by reference herein and priority of which is hereby claimed.

BACKGROUND OF THE INVENTION

This invention relates to an interlock vessel for use in a hyperbaric transfer system. Deep sea diving, whether for pleasure or work, is associated with a serious risk of trauma to the divers. Without proper treatment, major problems from diving accidents, most commonly Decompression Sickness (the “Bends”) and Air Embolism, can lead to permanent disabling injuries and in some instances be fatal. Conventionally, offshore rig divers who work at great depths for considerable amounts of time must undergo decompression for periods up to two weeks. Normally, the decomposition takes place in a conventional decompression chamber on the offshore rig or on a deck of a dive boat. However, in rig abandonment situations or in situations in which a diver is seriously injured, it may be necessary or desirable to leave the offshore decompression chamber. In such cases, the divers undergoing decompression must be transferred from the offshore rig to another hyperbaric facility.

Dive chambers are examples of a category of pressure vessel referred to as a PVHO (i.e.—pressure vessel for human occupancy). Once the divers are inside the vessels of the transfer system, their condition must be kept stable. In keeping with this objective, the problem arises of keeping the gas mixtures constant within the vessels of the transfer system. This includes both the pressures and concentrations of the compression gas, the breathing gas and the oxygen within the chamber. It is especially true for the oxygen supply within the vessel which must be replenished as it is used.

Conventionally, the oxygen could be regulated by feeding oxygen into the vessel and providing the vessel with an oxygen analyzer which would measure the gas concentration within the vessel. Similar analyzers and meters could be provided for compression or breathing gas mixtures. However, the process of feeding gas into the chamber, waiting for the pressure or concentration within the vessel to stabilize and reading the analyzer is slow and requires the complete attention of the individual performing the operation. In an emergency situation, such as a fire on the offshore rig, the time necessary to take an accurate measurement is not available. The persons moving the vessel have all they can do just moving the vessel or removing the vessel from the offshore rig. Furthermore, in an emergency situation, there is no assurance that personnel capable of accurately metering gas into the vessel and reading the analyzer will be available.

While the diver is in the decompression chamber, if medicines or supplies must be passed to the diver, an air lock must be used. The air lock on a dive chamber consists of a steel tube which penetrates the wall of the dive chamber. The steel tube has a door called a “closure” on each end. An air lock on a pressure vessel for human occupancy (e.g. a decompression chamber) should be able to be operated quickly and easily, should be able to accommodate moderate wear without catastrophic failure and should have an interlock so that the operator’s actions are reasonably constrained. If the closure is economical that is an advantageous feature also.

The transfer chamber has specific requirements. For instance, the exterior closure must withstand the internal pressure of the dive chamber when the inner door is open. A device called a quick opening closure is suitable for this purpose. An economical choice for this small diameter application is a breech-lock type “two-ring” design familiar to those skilled in the art of quick opening closures. A two-ring style door uses a body ring welded to the body of the air lock and a “moving ring” which is the door. The door ring has radial lugs pointing outward. The body ring has radial lugs pointing inward. When the door ring is swung into the body ring and rotated, the door lugs engage their companion lugs on the body ring. Because the mating surfaces of these lugs are sloped, the relative rotational motion of the lugs on the two rings causes the door ring to be drawn toward the body ring, and thereby energize the seal which is between the two rings.

Such two-ring closures are in contrast to “three-ring” closures in which the door and body ring are non-rotating, but a third ring outside of those two rings (a lock ring) rotates to engage mating lugs on the door and/or body ring and thereby affect a seal. Compared to three-ring closures, two-ring closures are beneficial as they do not have the expense of the third ring, do not require lubrication of the sliding surfaces of the third ring, and do not have their high stress areas hidden under a third ring. These advantages are particularly useful in a competitive commercial application such as a dive chamber where the closure is subjected to accelerated aging caused by an outdoor marine environment.

The two-ring doors are not without their problems. One of the hazards associated with any manually operated quick opening closure is that the operator can attempt to operate the closure while it is under pressure. As a consequence, the operator can be injured or an injury can be inflicted on a diver positioned in the small-size decompression chamber. The general methods used to prevent the two-ring doors from being opened while under pressure rely on indicators or interlocks. Examples of “indicators” are a pressure gage or pressure actuated spring loaded pop-up piston. Indicators only notify the operator and depend on his recognizing and acting on the information which the indicator is presenting. Also, spring-loaded piston indicators retract when a small pressure still remains in the chamber so that a false “OK” signal can be communicated.

Another disadvantage of two-ring doors is related to the door support because the door not only swings out, but also rotates about its axis. Because of this, the a two-ring door hinge typically connects to the door via a bearing in the hinge blade which supports an axle in the center of the door. Bearings eventually wear and that allows alignments to change. This alignment is relevant because O-rings are the preferred sealing devices for quick opening closures because they are economical and readily available, and because they are in a class of gaskets referred to as “self-energizing.”

Self-energizing gaskets use the pressure of the fluid they are retaining to contribute to their sealing force. O-rings seals do require containment in a cavity with limited gaps to prevent a form of failure referred to as “extrusion.” Extrusion failure of O-rings and the design gap sizes required to prevent it are described in O-ring design handbooks such as the “Parker O-Ring Handbook” and are familiar to those skilled in the art of O-ring joint design. For a closure where human life depends on its proper operation, a concentricity misalignment of the door which leads to a gap and possible extrusion failure is unacceptable.

An interlock is a device which constrains the operator from opening the door until after a vent has been opened. An example of a previous solution for a two-ring door would be a threaded vent plug in the door which is chained to a stationary part of the vessel. Compared to three-ring closures, small two-ring closures are more of a design challenge to interlock because the motion of the door needs to be constrained relative to the venting of the chamber. "Vent plug-on-chain" interlocks constrain behavior, but they are slow and awkward.

Another problem with dive chamber air locks relates to the operation of the inner closure or door. The inner door swings inwards. As a result a pressure differential between the living space and the air lock chamber presses the inner door against the seal between it and the air lock body tube. The air lock inner door, therefore, does not need a closing mechanism when a pressure difference exists. However, dive chambers are utilized on ships which can have large motions, and they are frequently moved to the next dive job location on trucks. During these periods an unsecured door will bounce open and closed and possibly cause damage. Also, while on the deck of a vessel that is listing (for example while discharging a portion of its cargo) an unlatched inner door can swing open on its own.

If the inner door does open by itself when the dive chamber is pressurized but unoccupied, the operator standing outside cannot reach through the outer door to close the inner door because the pressure on the air lock outer door cannot be isolated from the pressure in the dive chamber. The inconvenient remedy is to release the pressure in the dive chamber so that the problem can be addressed. A seemingly simple solution is a swing bolt latch or other clamping latch on this inner door. But, this has the disadvantage that it can hold the door closed and trap pressure inside the air lock as the living space of the dive chamber is reduced during the depressurization treatment. Such a condition could lead to an explosive release of the inner door upon the failure of this latch.

SUMMARY OF THE INVENTION

It is, therefore, an object of the present invention to provide an interlock assembly for use with decompression or hyperbaric transfer systems.

It is another object of the present invention to provide an interlock assembly that has a number of locking/latching safety locks to prevent an undesirable rapid venting of the decompression chamber, wherein a diver and/or patient is situated.

These and other objects of the present invention are achieved through a provision of an interlock assembly for use with decompression chambers or hyperbaric chambers. The interlock assembly is formed as a hollow air tight vessel with open ends, which are selectively closed by a respective inner door and an outer door. A sidewall extends between the opposite ends, and the inner door and the outer door have hinge assemblies that are secured to the sidewall for pivotal movement of the doors. The outer door is also rotatable in relation to the outer end of the vessel. The inner door is mounted at an interior end of the vessel in air communication with the decompression chamber when the inner door is open.

Both the inner door and the outer door are equipped with latch assemblies for safely closing the doors to maintain the air tight environment inside the interlock chamber. Both doors are provided with a sealing O-ring fitted on the inside surface of the respective door to facilitate the air-tight engagement of the door with the sidewall edge. A ring mounted at the outside edge of the vessel allows at least one locking pin to selectively extend therethrough to prevent undesirable rotation and opening of the outside door before the pressure is equalized. A pressure relief valve is operationally connected to the first latch means for rapidly venting pressure inside the vessel when the first latch means is moved to an open position.

BRIEF DESCRIPTION OF THE DRAWINGS

Reference will now be made to the drawings, wherein like parts are designated by like numerals, and wherein.

DETAIL DESCRIPTION OF THE PREFERRED EMBODIMENT

Figure 1:
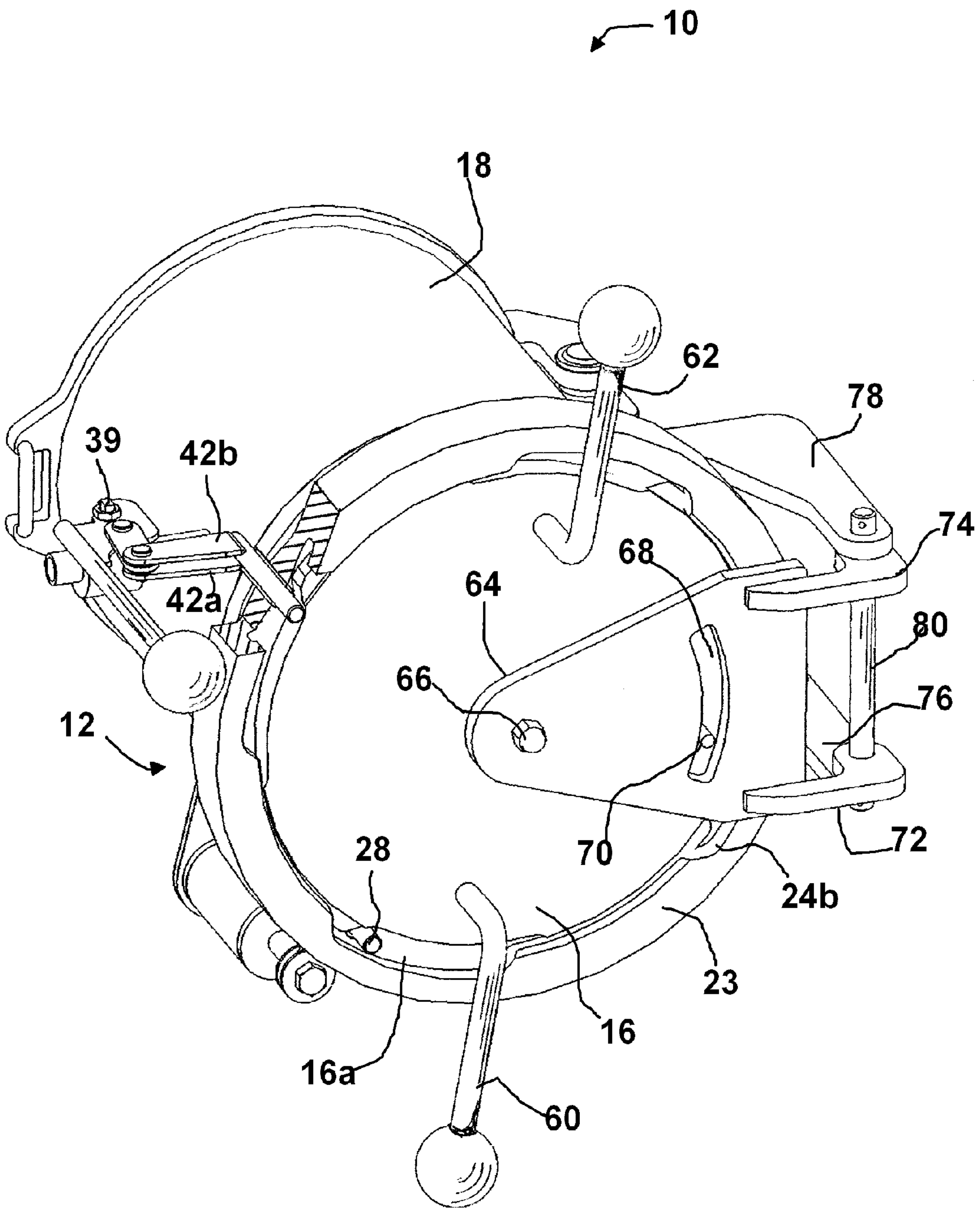
FIG. 1 is a perspective view of the interlock (airlock) assembly of the present invention in a closed position.
Figure 2:
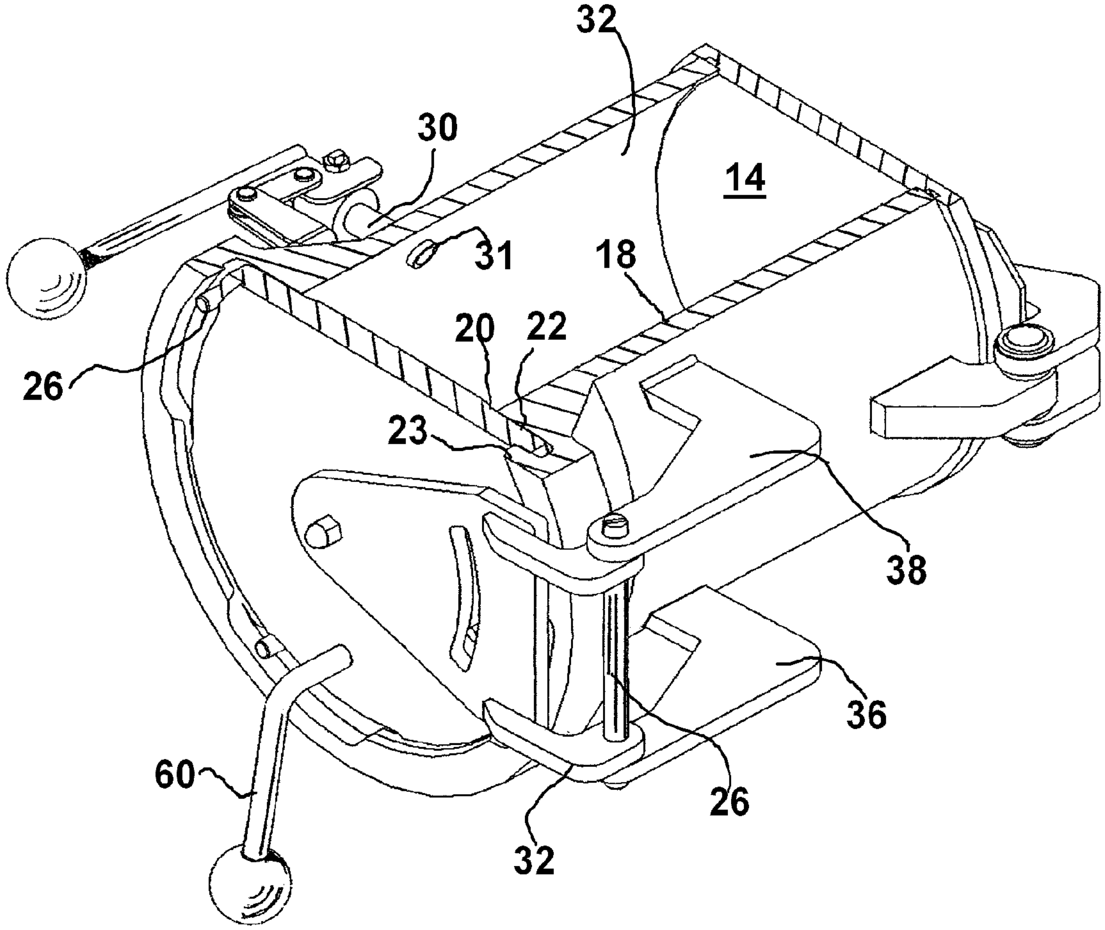
FIG. 2 is a partially cut-away view of the airlock assembly with the lever handle in a closed, engaged position.
Figure 3:
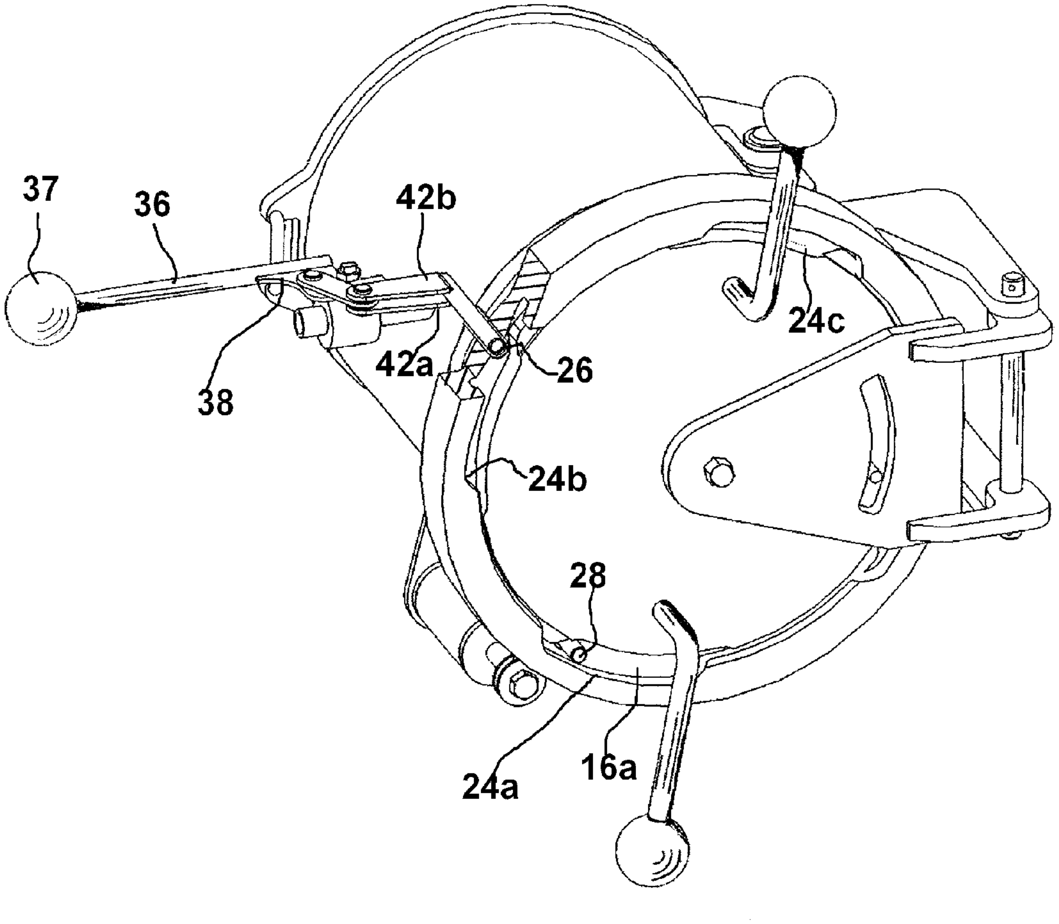
FIG. 3 is a perspective, partially cutaway view of the airlock assembly of the present invention, with the lever handle in a disengaged position.
Figure 4:
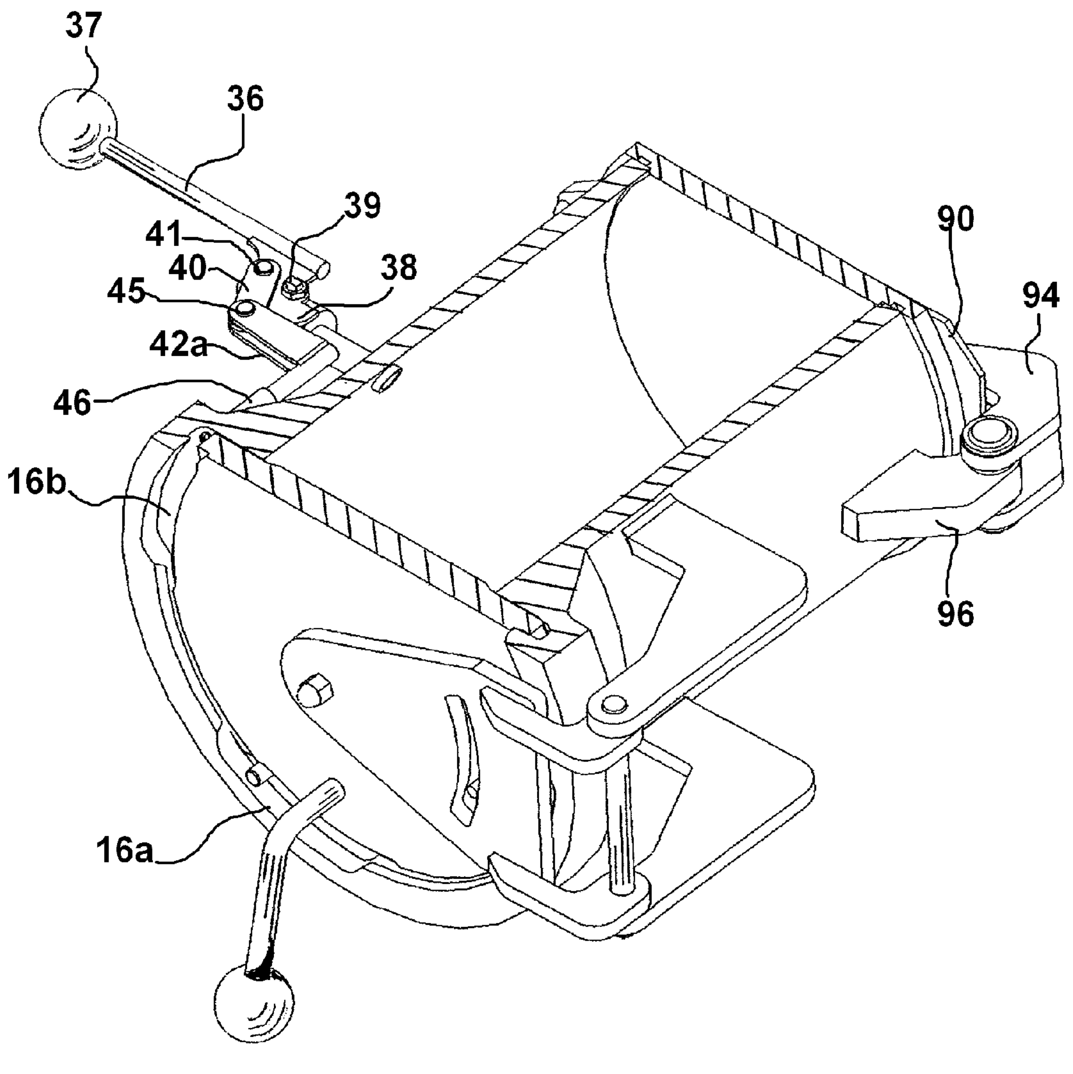
FIG. 4 is a partially cut-away view of the airlock chamber, or assembly of the present invention with the lever handle in a disengaged position and showing a retracted safety lock pin.
Figure 5:
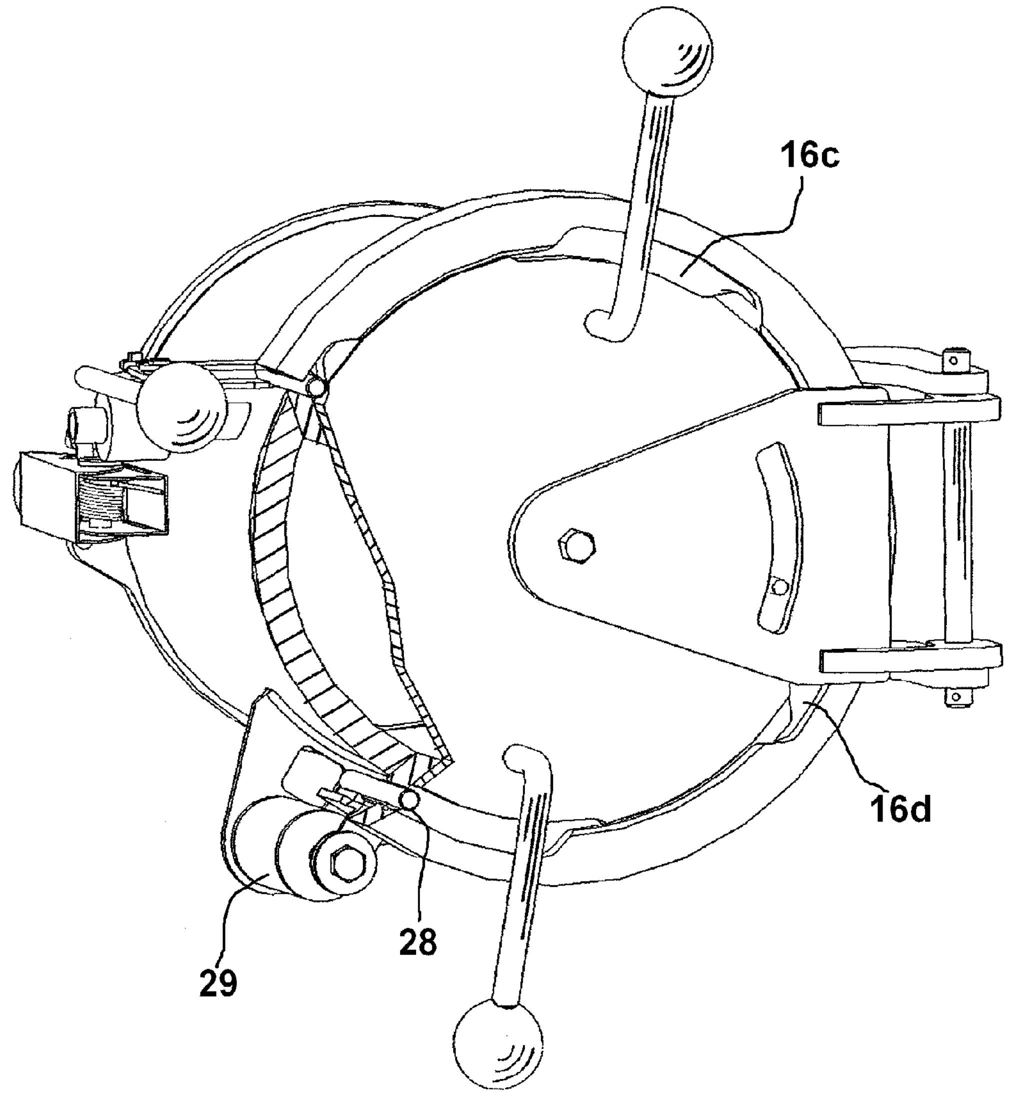
FIG. 5 is a perspective, partially cutaway view illustrating the lock pin and the safety lock pin extending through the bayonet ring and preventing the ring rotation.
Figure 6:
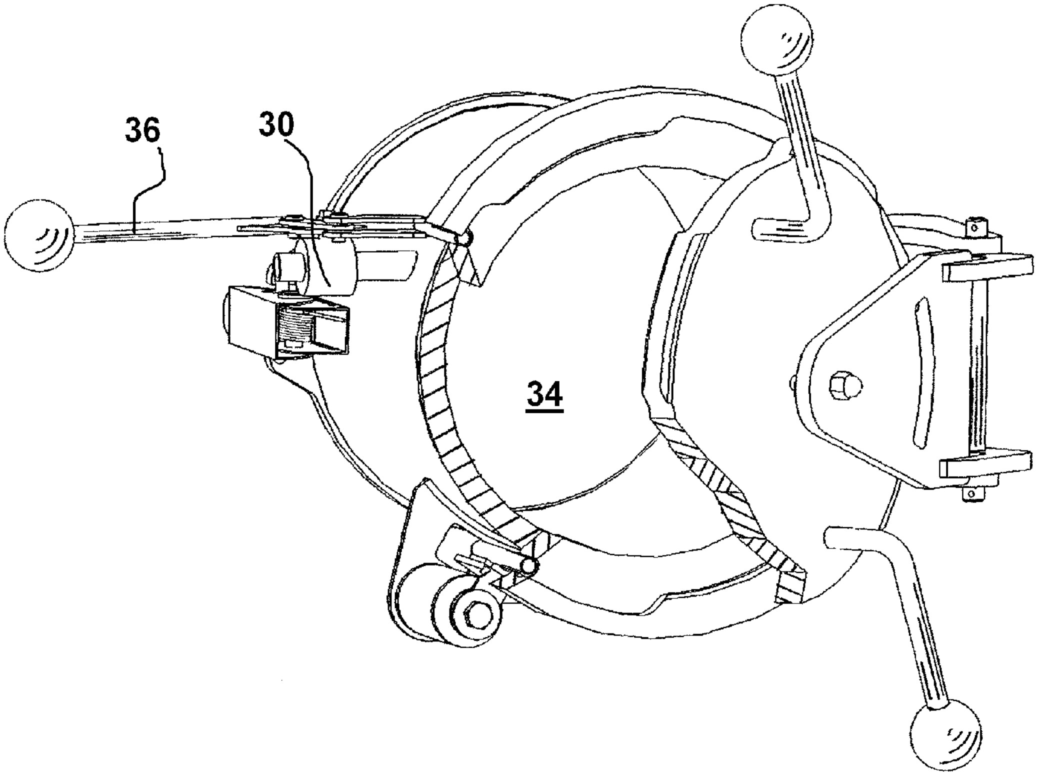
FIG. 6 is a perspective, partially cutaway view illustrating the lock pin and the safety lock pin retracted to allow the bayonet ring rotation.

Turning now to the drawings in more detail, an airlock assembly of the present invention is generally designated by numeral 10. In the following description, the terms "airlock assembly," "interlock vessel," and interlock assembly are used interchangeably. The airlock assembly, or vessel is designed to be used in a decompression chamber (hyperbaric chamber) transfer system. One end of the vessel 10 is in communication with a decompression chamber, while the outside end thereof extends outside of the hyperbaric chamber. The apparatus 10 comprises an airtight body 12 closed on one end by an inner door 14 and closed on the opposite end by selectively pivotal outer door 16 secured on the opposite end.

A portion of the body 12 with the inner door 14 normally extends into a hyperbaric chamber, wherein a patient or a diver rests. A portion of the body 12 that has the outer door 16 normally extends outside of the hyperbaric chamber and the patient positioned in the hyperbaric chamber does not have access to the handles operating the outer door 16. The patient normally has access to the inner door 14 and can operate the door 14 to open and close the door.

A continuous sidewall 18 forming a part of the body 12 can be configured to form a cylindrical body. An upper edge 20 of the sidewall 18 forms an outwardly extending shoulder 22, on which the outer circumference of the door 16 rests. The door is rotatably mounted in relation to the shoulder 22. An outer ring 23 is unitary secured to the shoulder 22. The outer ring 23 has one or more cutouts 24*a*, 24*b*, 24*c*, and 24*d* that can be equidistantly spaced about the circumference of the ring 22.

A lock pin 26 and a safety lock pin 28 extend through the cutouts 24*b*, and 24*a*, respectively, when the door 16 is closed and locked. The lock pin 26 and the safety lock pin 28 retract into the shoulder 22 before the door 16 can be rotated to open. The door 16 has corresponding tongues 16*a*, 16*b*, 16*c* and 16*d* that cover the cutouts 24*a*, 24*b*, 24*c*, and 24*d* when the cover 16 is closed. The safety lock pin 28 is connected to a spring-activated piston 15 moving inside a piston chamber 29. The piston chamber 29 communicates with the pressure inside the body 12 through an opening 17 formed in the sidewall 18 of the body 12. The piston normally pushes the safety lock pin 28 into an extended position through the shoulder 22 of the ring 23. A compression spring 25 surrounds the piston 15. When the pressure equalizes the spring 25 is no longer compressed and it pushes against the piston 15, moving the piston toward the opening 17. When the pressure inside the body 12 equalizes, the piston retracts allowing the safety lock pin 28 to slide out of engagement with the shoulder 22. When both pins 26 and 28 are in their retracted position, the outer door 16 can be rotated and then pivoted to open.

An interlock valve 30 is secured on the exterior of the sidewall 18; the valve 30 establishes an air flow communication between an exterior of the body 12 and interior thereof. An inner portion 31 of the valve 30 extends through an inner wall 32 of the interlock body 12. When opened, the valve 30 admits air into a chamber 34 defined by the interlock body 12 and facilitates equalization of pressure between the hyperbaric chamber (not shown) and the ambient atmosphere. When closed, the valve 30 prevents the air flow between the interior of the body 12 and exterior thereof.

An elongated handle 36 regulates opening and closing of the valve 30 through a valve member 39. The handle 36 has a gripping portion 37 on one end thereof, and a handle attachment plate 38—on the opposite end thereof. A linking means is secured to the handle attachment plate 38. The linking means comprises a first link member 40 pivotally secured by a securing pin 41 to the handle attachment plate 38, a second link members 42*a*-42*b*, which is comprised of a pair of parallel plates that sandwich a free end of the first link member 40 therebetween. A pivot pin 45 is inserted through aligned openings formed in the free end of the first link member 40 and the second link members 42*a*, 42*b*, allowing the second link members to pivot about the axis of the pin 45 when the handle 36 is pulled toward or away from the body 12.

The axis of the pivot pin 45 is offset from the axis of the securing pin 41 by about 10 degrees when viewed in relation to an imaginary central axis extending between the centers of the securing pin 41 and the pin 45. As a result, the initial movement of the handle 36 does not produce an immediate retraction of the lock pin 26 from the cutout 24*b*. When the handle 36 travels to about 90 degree position (shown in phantom line in FIG. 7) in relation to its original position (shown in solid line in FIG. 7) the linking member 40 travels about 70-80 degrees.

Figure 7:
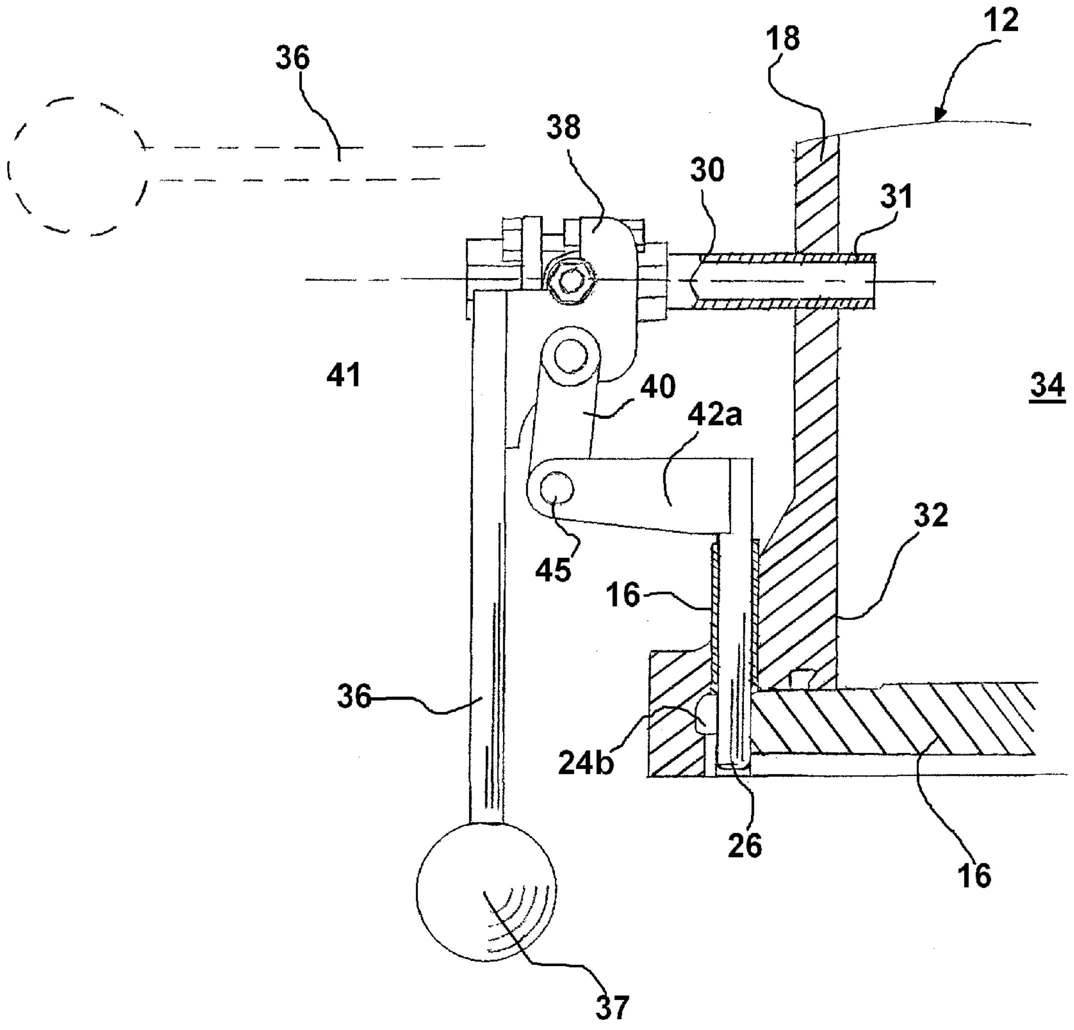
FIG. 7 is detail view illustrating a linking means of the interlock assembly of the present invention.
Figure 8:
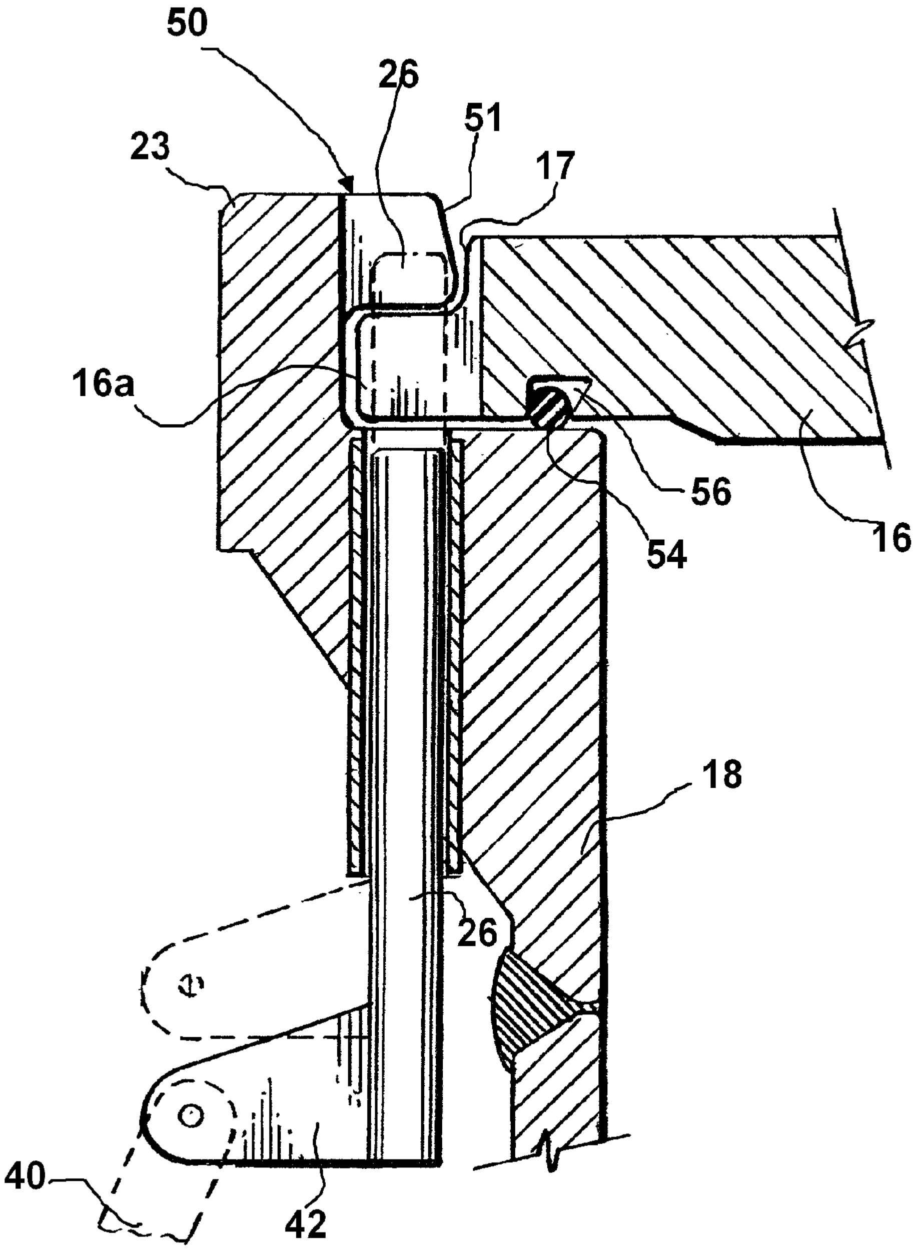
FIG. 8 is detail, partially cross-sectional view illustrating the interlock pin operation.

The lock pin 26 is fixedly attached to the free ends of the second link members 42*a*, 42*b*, such that the reciprocal movement of the handle 36 moves the lock pin 26 between an extended position, within the cutout 24*b*, as shown in FIG. 7, and a retracted position shown in solid line FIG. 8. If desired, a portion of the lock pin 26, which enters and extends through the shoulder 22 can be slidably positioned within a protective guide sleeve 46, which is fixedly secured on the underside of the flange that forms the shoulder 22.

A pair of body ring lugs 50 (FIG. 8) are secured to the ring 23 and overlap the tongues 16*a*, 16*b*, 16*c*, and 16*d* (FIG. 8). The tongues 16*a*-16*d* each have a curved upper surface 17 that compliments an inner surface 51 of the body ring lugs 50. The tips of the lugs 50 can contact raised surface 17 of the tongue 16*a* for alignment. Raised surface 17 aligns the door 16 even if the hinge is worn.

An O-ring 54 is fitted in a dovetail-shaped groove 56 formed in the inner surface of the door 16, as shown in FIG. 8. To prevent the O-ring 54 from falling out of the groove 56 when the door 16 is open, the instant invention provides for a raised contoured surface 17 on the tongue 16*a* of the door 16. The tongue 16*a* has a diameter only slightly less than the inside diameter of the tips of the body ring lugs 51. This constraint prevents the door from moving out of concentricity even if the center bearing wears or if the hinge is caused to become misaligned in such a way that a door concentricity error would otherwise be created. The larger side of the groove 56 is inside the body of the door 16. The O-ring 54 is then sized to be 1½ percent smaller than the theoretical size so that it stays in the groove 56 when the door 16 is opened.

The outer door 16 is provided with a pair of handles 60, 62 extending from an outside surface thereof. The handles 60, 62 allow the user to pivot the door 16 about a central axis when the pins 26 and 28 are in their retracted position from the shoulder 22. A reinforcing plate 64 extends over a portion of the door 16 and is retained in a generally parallel relationship thereto by a pint 66, about the axis of which the door 16 rotates.

The reinforcing plate 64 is provided with a slot 68 which receives a stop pin 70 in a sliding engagement thereto. The stop 70 is attached to the exterior surface of the door 16 and moves within the limits defined by the slot 68, limiting the rotational movement of the door 16. After the pins 26, 28 have been retracted the door 16, a user can grab the handles 60, 62 and rotate the door within a pre-determined arc restricted by the length of the slot 68.

The securing plate 64 carries a pair of pivotal arms 72, 74 that are pivotally attached to mounting brackets 76, 78, respectively by a hinge rod 80. The mounting bracket 76, 78 are each attached to the sidewall 18 of the body 12. After the door 16 has been rotated to move the tongues 16*a*, 16*b*, 16*c*, and 16*d* from the overlapping portions of the ring 23 between the cutouts 24*a*, 24*b*, 24*c*, 24*d*, the user can pivot the door 16 to allow exit of the patient or diver from the hyperbaric chamber through the inner door 14 and then through the outer door 16.

Turning now to FIGS. 9-13, the inner door 14 will be described in more detail. As can be seen in the drawings, the door 14 is mounted for pivotal movement in relation to the body 12 between an open position, a closed, sealed position and a plurality of partially open/closed positions. The door 14 carries a reinforcing plate 90, which is secured to a pivot axle 92. The pivot axle 92 is engaged between a pair of parallel arms 94, which are in turn secured to a supporting bracket 96. The bracket 96 is affixed to the sidewall 18 of the body 12. A handle 98 is attached to the outside surface 100 of the door 14.

Figure 9:
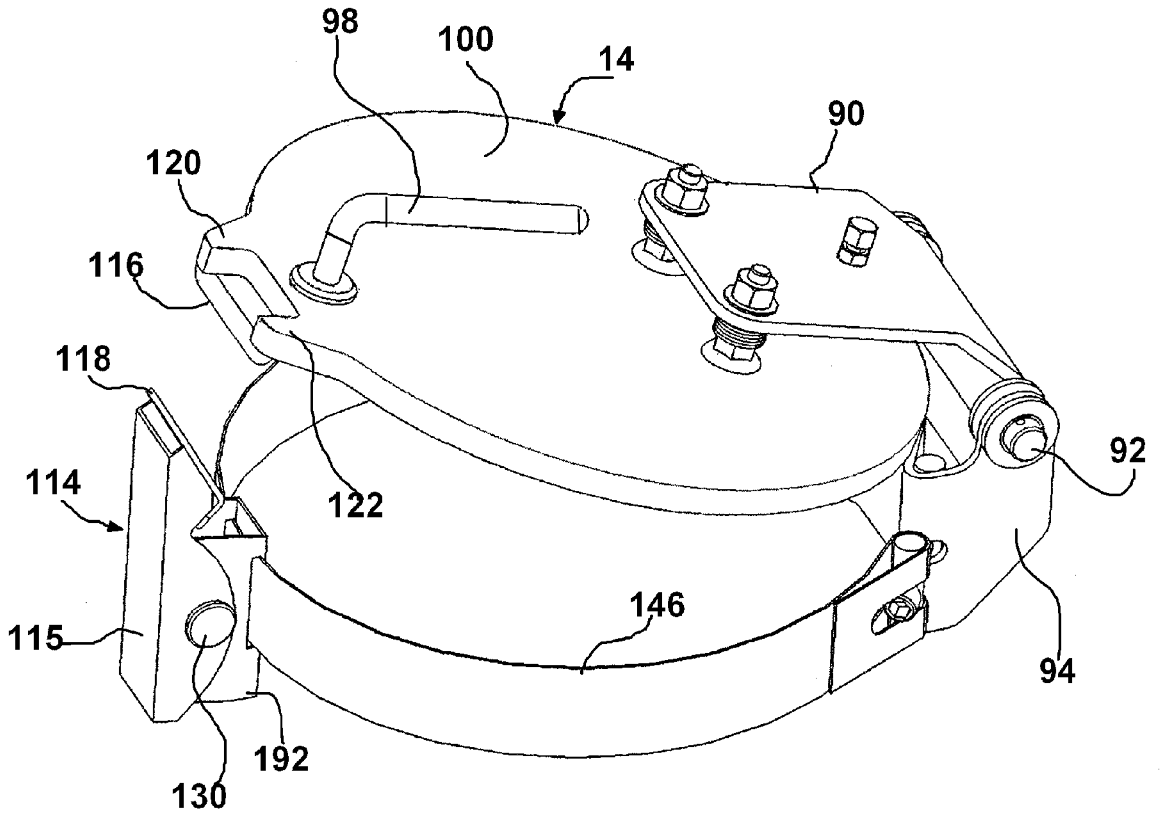
FIG. 9 is a perspective detail view of the inner door of the interlock chamber of the present invention.
Figure 10:
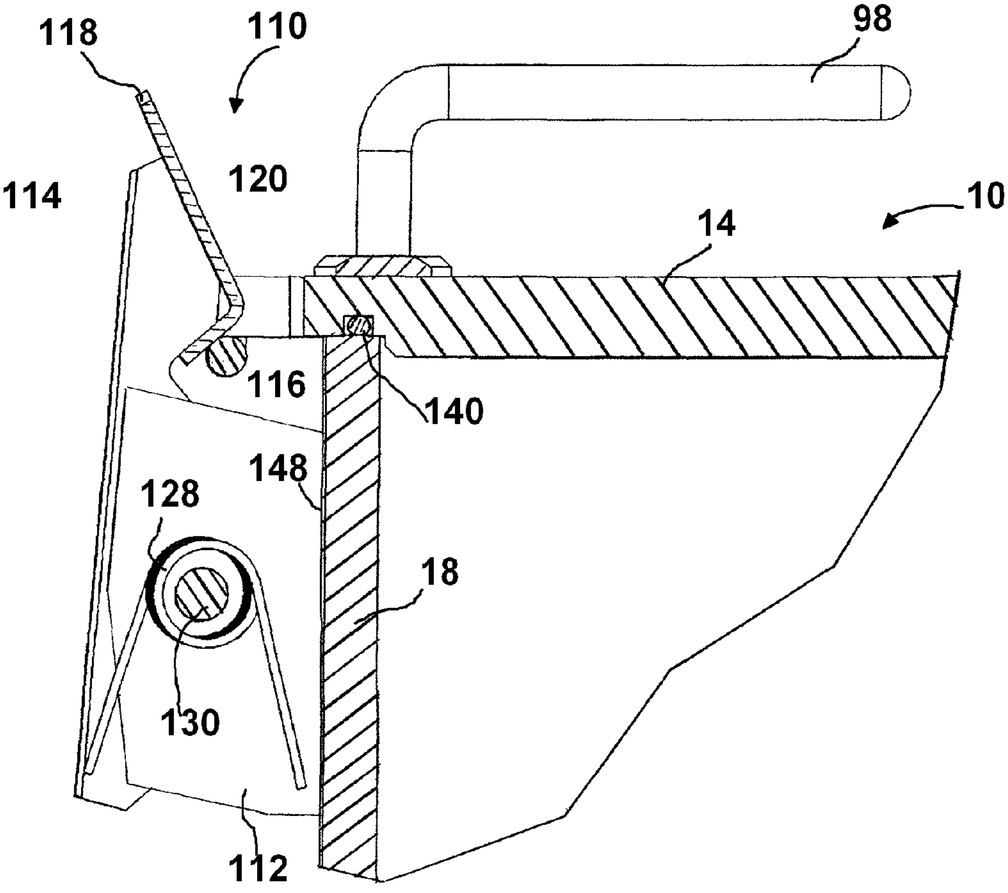
FIG. 10 is a detail, partially cross-sectional view illustrating an inner door spring-operated latch in a closed position.
Figure 11:
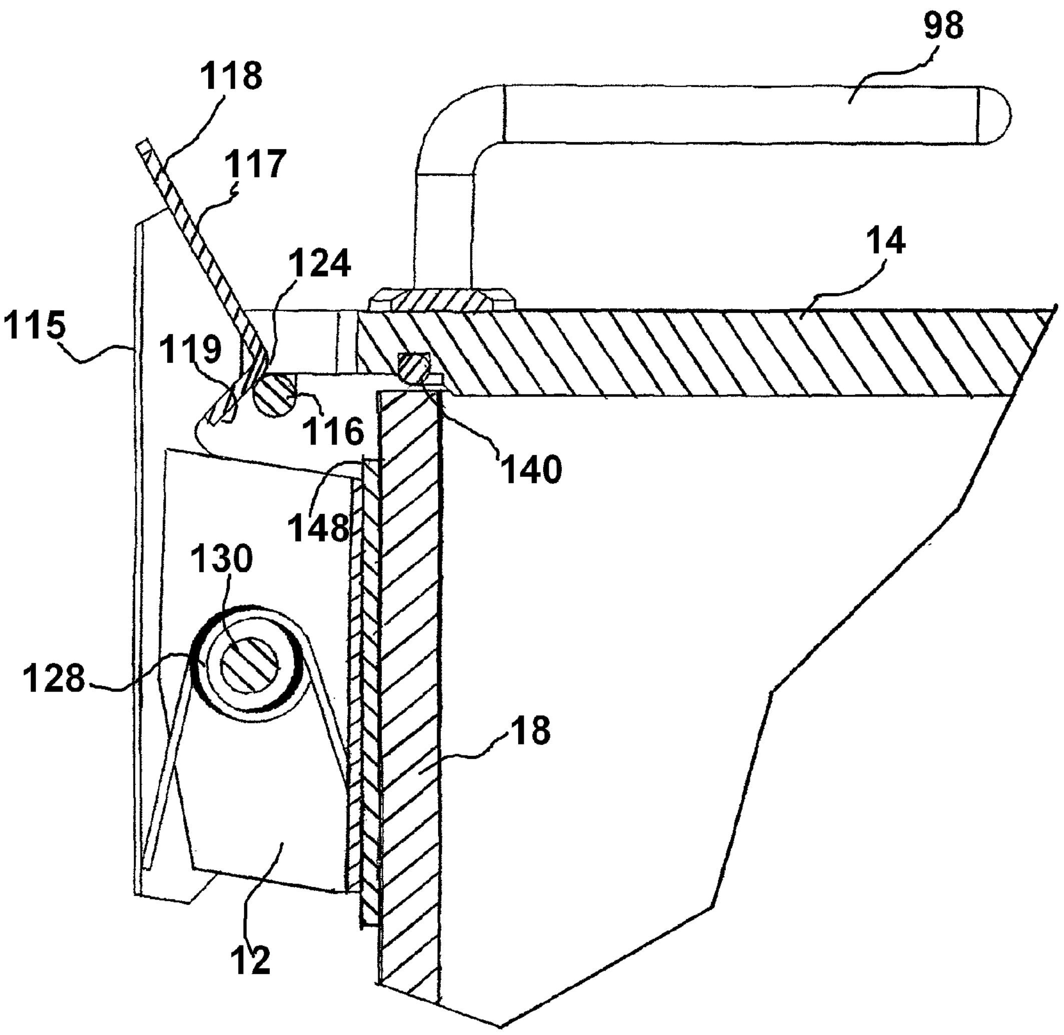
FIG. 11 is a detail, partially cross-sectional view illustrating an inner door spring-operated latch in a partially open position.
Figure 12:
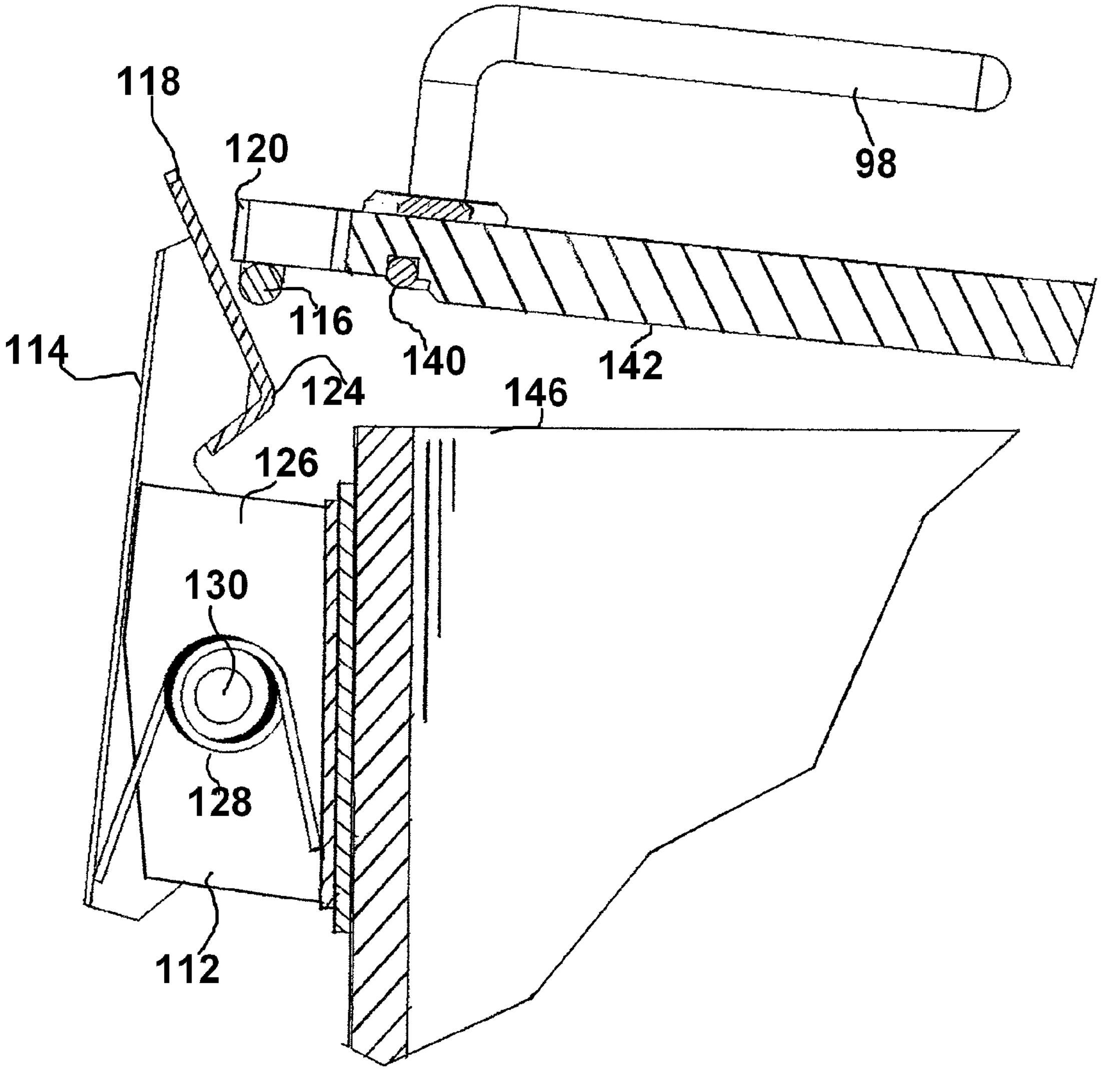
FIG. 12 is a detail, partially cross-sectional view illustrating an inner door spring-operated latch in an open position.

Diametrically opposite the pivot axle 92 is an inner door latch assembly 110. The inner door latch assembly comprises a latch base 112, a latch body 114, a latching bar 116 and a pivotal inner door latch member 118. The inner door latch member has a contact plate that has a slanted first portion 117 and a second portion 119 oriented at about 90 degrees in relation to the portion 117. An area of connection between the portions 117 and 119, or lead-in portion 124 works as a stop for a latching bar 116 carried by the door 14. The latching bar 116 is affixed between outwardly extending arms 120, 122 unitary connected to the door 14, as shown in FIG. 9. When the door is closed the latching bar 116 is engaged below the lead-in portion 124 of the inner door latch member 118 and a top edge 126 of the latch base 112.

A torsion spring 128 is mounted about a pivot rod 130 between the outside of the latch base 112 and the inside of the latch body 114. The torsion spring 128 forces the latch body 114 into a normally closed position toward the latching bar 116. To open the inner door 14, the user holds the handle 98 and pushes on the inner door latch member 118 with the user's thumb. The latch member 118, which is secured on the pivotally movable latch body 114, moves away from the bar 116 and allows the door 14 to be open to vent the pressure inside the hyperbaric chamber into the body 12 of the interlock apparatus 10. A wall 115 of the latch body 114 limits the outward movement of the inner door latch member 118. The handle is located above the thumb-pressed latch release member 118, thereby preventing finger pinching by the latch.

After the pressure vents, the sloping side of the latch release member 118 pulls the door 14 closed again. If the pressure inside the body 12 is ever higher than the pressure outside of the body 12, the door 14 lifts and vents.

An O-ring 140 is positioned in a groove 142 formed on an inner surface 142 of the handle 14. The O-ring seals the door 14 against an edge 146 of the body 12 when the door 14 is closed. A strap of mounting clamp 148 can be secured on the sidewall 18 between the latch base 112 and the wall 18.

Figure 13:
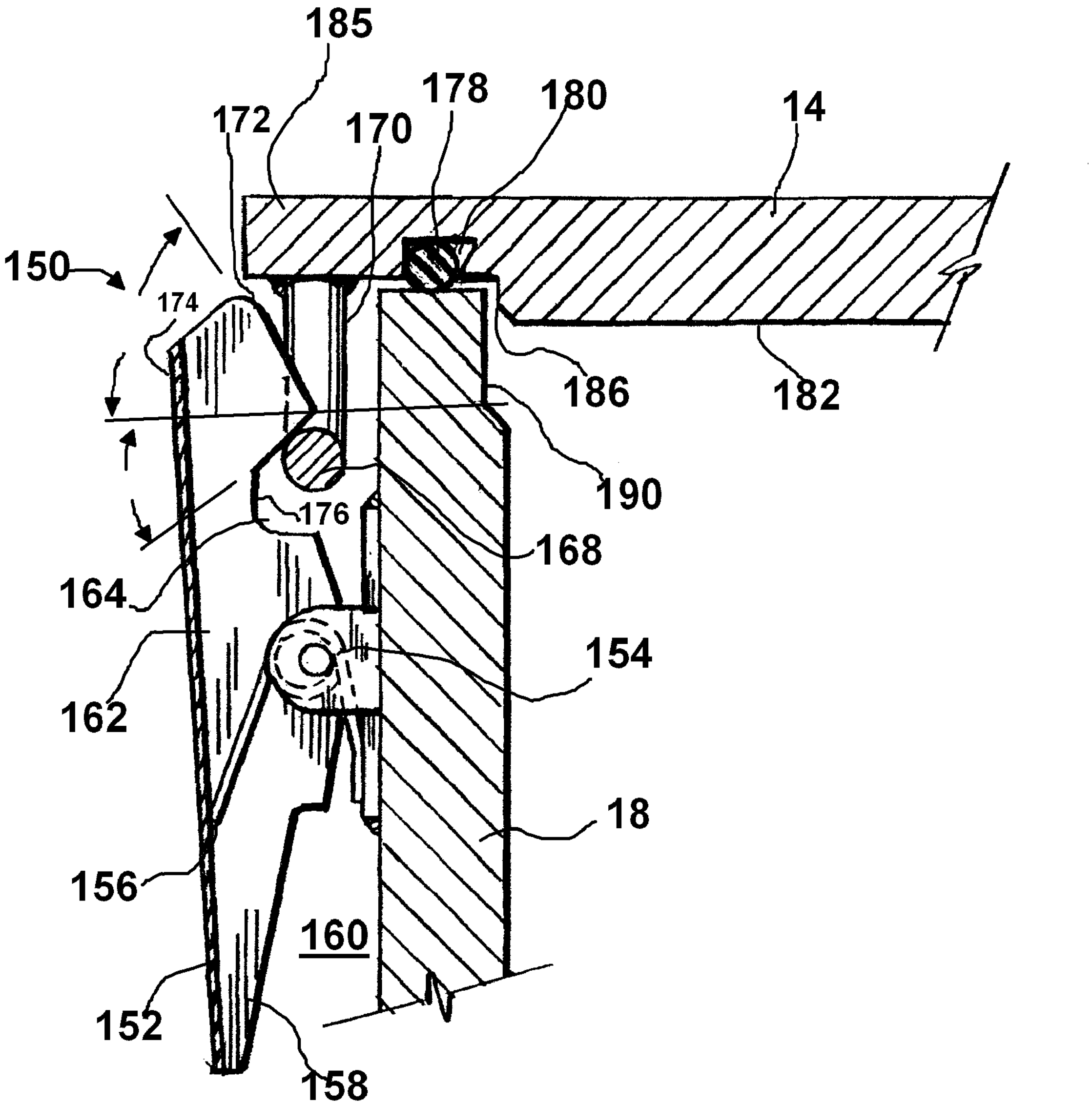
FIG. 13 is a detail, partially cross-sectional view of an alternative embodiment of the inner door latch.
Figure 14:
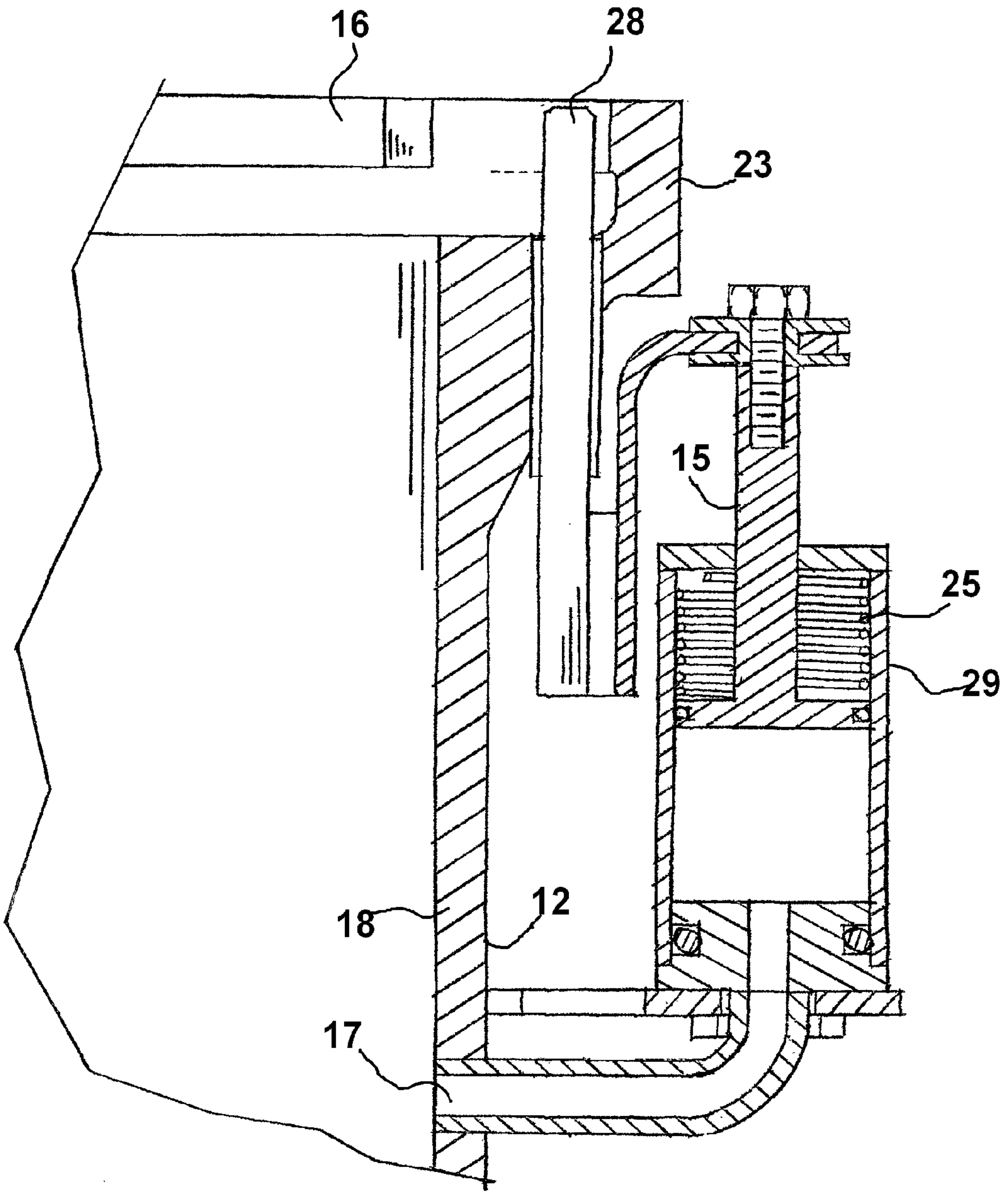
FIG. 14 is a cross sectional detail view illustrating a safety lock pin in an extended position.
Figure 15:
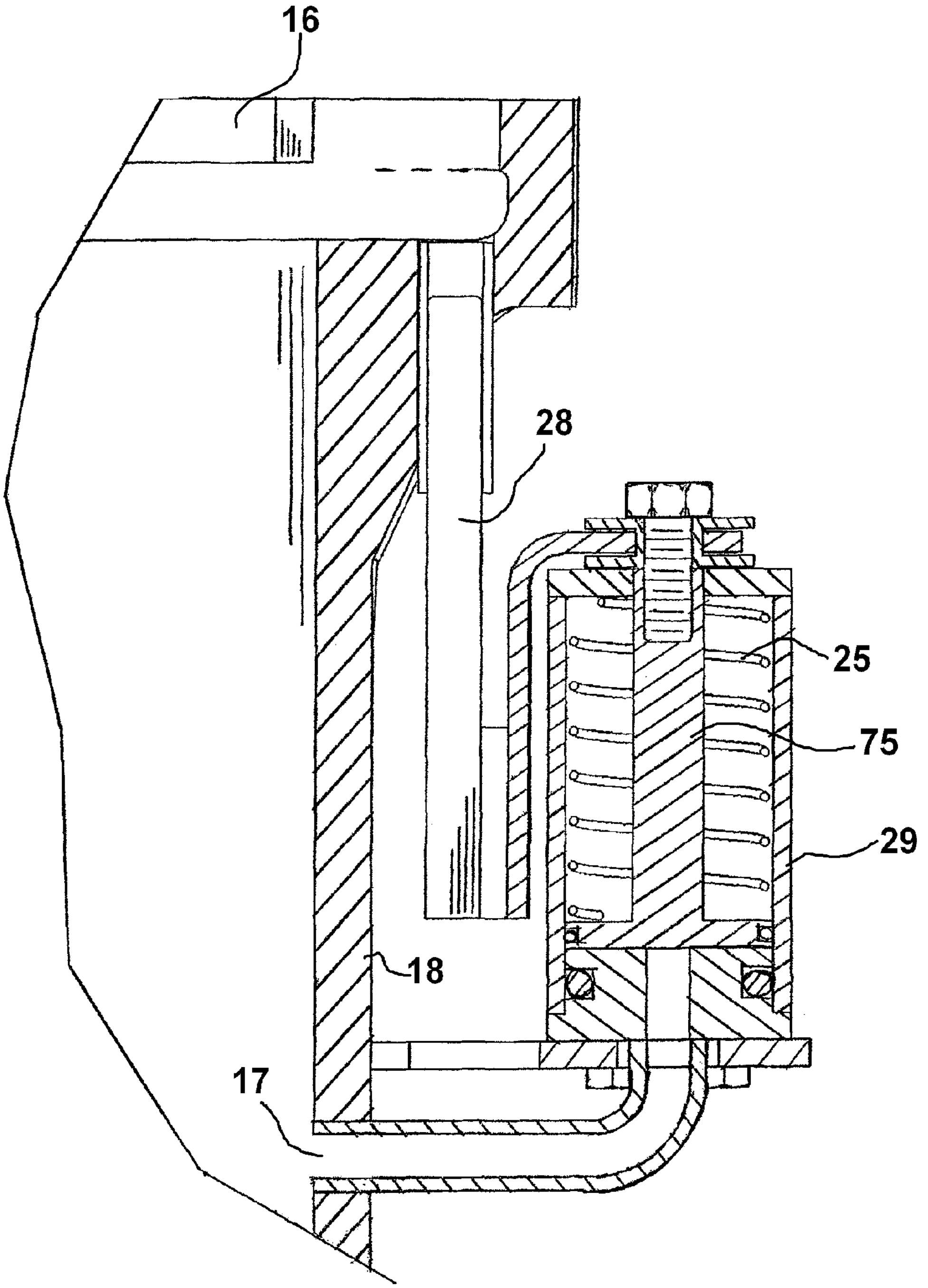
FIG. 15 is a cross-sectional view illustrating the safety lock pin in a retracted position.

Turning now to an alternative embodiment of the inner door latching assembly and with specific reference to FIG. 13, the latching assembly is designated generally by numeral 150. The assembly 150 comprises a pivotal latch body 152 adapted for a limited pivotal movement about a pivot pin 154. A torsion spring 156 partially wrapped around the pivot pin 154 normally urges the latching assembly into a closed position. One end 158 of the latch body 152 has a reduced width so that a space 160 exists between the portion 158 and the outside of the sidewall 18.

A second end 162 of the latch body 152 has a cutout 164 formed above the area of connection of the latch body 152 to the pivot pin 154, which is configured and sized to engage with a cross bar 168 of a U-shaped bar support member 170. The bar support member 170 is secured to the underside of the inner door 14. The end portion of the latch body 152, which engages the cross bar 168 has a generally hook-shaped configuration for engaging the bar 168. The latch body 152 has a sloping inner surface 172 and a generally planar outer surface 174. The sloping surface 172 forms an approximately 60 degree angle in relation to the surface 174.

The groove 164 has a sloping surface 176, which contacts the cross bar 168. The surface 176 forms a relatively small angle, approximately 45 degrees with the outer surface 174. The shallow cutout 164 facilitates retaining of the door 14 in a normally closed position. An O-ring 178 is fitted in a dovetail-shaped groove 180 formed on an inner surface 182 of the door 14. The outer edge 185 of the door 14, where the O-ring and the locking member 170 are located has a reduced thickness with a shoulder 186 formed between the main portion of the door 14 and the outer edge 185. The shoulder facilitates alignment of the sidewall 18 with the door 14 and prevents misalignment thereof when the door is being closed.

If pressure in the airlock chamber becomes higher than the pressure of the outside airlock the force on the inside of the door 14 will push against the larch 150. The spring 156 and the latch body 152 will allow the door 14 to slightly open, breaking the seal and vent the pressure. Once the pressure equalizes the door will reseal under the force of the spring pushing on the end portion 162. If the user wishes to open the door 14, the user will push on the end 158, causing the latch body 152 to pivot away from the cross bar 168, thereby allowing the door 14 to be pivoted into an open position.

The present invention solves the problem of the inner door latch problem by providing for the use of a simple, rugged economical spring loaded latch that holds the inner door 14 securely closed during shipment, but yet allows the inner door to temporarily lift off of the seal, and thereby vent any differential pressure which may exist in the air lock. The latch has several characteristic features that allow it to perform these functions. When the door is in the closed position the locking member 170 bears on the inside of the latch hook whose angle combined with the spring force causes the door 14 to close against the door seal.

In the event of a pressure differential attempting to open the door, the latch allows the door 14 to lift off of the seal to vent the pressure. The spring 154 and sloping contact surface of the latch pull the door closed again after the pressure is released. The latch also allows the door 14 to be closed without manually depressing the latch body 152 because the slope 172 of the latch tip combined with its spring action allow the locking member 170 to snap past the latch hook when the door is pressed closed.

The inner door 14 uses the O-ring 178 as a seal for the same reasons as the outer door. Conventional solutions provide for the O-ring groove to be formed in the end of the tube interlock body. The disadvantage of that is that if the groove becomes damaged, the air lock needs to be cut out of the vessel to be re-machined or a very expensive in-place machining operation must be performed if it is available. The present invention solves this problem by placing the O-ring groove in the door. The sealing face on the body 12 is now merely flat. A flat surface is less likely to become damaged, and if damaged it can be repaired using manual methods (e.g.—a hand file). The O-ring groove 180 can now be easily repaired because the door 14 can be removed and taken to a machine shop.

Placing the O-ring groove in the door creates a condition that must be considered, though. If the door 14 moves out of position, a gap can be created in the O-ring groove which could allow the O-ring to fail in extrusion as described above. The solution is to bore the inside of the end 190 of the air lock body 12 and create a raised center on the air lock side of the inner door 14. The raised center with the sloping surface 186 of the door 14 registers in the reduced thickness (bored out) end 190 of the body 12 so that the door 14 must be in positioned correctly when the door 14 is closed.

Many changes and modifications can be made in the design of the present invention without departing from the spirit thereof. I, therefore pray that my rights to the present invention be limited only by the scope of the appended claims.

I claim:

1. An interlock assembly for use with decompression chambers, comprising:

an air tight vessel provided with one opening at each of the vessel ends;

an outer door mounted at an exterior end of the vessel;

an inner door mounted at an interior end of the vessel, said inner door selectively communicating with the decompression chamber when the inner door is open;

a first latch mounted at the exterior end of the vessel for selectively locking the outer door in a sealed engagement with the exterior end of the vessel, said first latch allowing the outer door to move between a locked position and a plurality of selectively open positions;

a second latch mounted at the interior end of the vessel for selectively locking the inner door in a sealed engagement with the inner end of the vessel;

a third latch operationally connected to said vessel for preventing rotational movement of the outer door before pressure inside the vessel is equalized with pressure outside of the vessel wherein the third latch comprises a piston chamber in air communication with the inside of the vessel, a piston slidably moveable inside the piston chamber, and a safety lock pin operationally connected to the piston and engageable with the peripheral ring to prevent rotational movement of the outer door; and a pressure relief valve operationally connected to the first latch for rapidly venting pressure inside the vessel when the first latch is moved to an open position.

2. The apparatus of claim 1, wherein a peripheral ring is secured at the exterior end of the vessel, said peripheral ring forming a shoulder for engaging the outer door.

3. The apparatus of claim 2, wherein said outer door has an inwardly facing surface and an outwardly facing surface, and wherein an O-ring is fitted in a groove formed in the inwardly facing surface for sealing engagement with the peripheral ring.

4. The apparatus of claim 2, wherein said first latch comprises at least one latching assembly mounted on a sidewall of the vessel and engageable with the peripheral ring.

5. The apparatus of claim 4, wherein said at least one latching assembly comprises a handle, a handle attachment plate secured to the handle, and a linking assembly for selectively engaging the peripheral ring and preventing rotational movement of the outer door in relation to the exterior end of the vessel.

6. The apparatus of claim 5, wherein said attachment plate is secured to a valve member for opening and closing the pressure relief valve.

7. The apparatus of claim 5, wherein said linking assembly comprises a first link member pivotally secured by a securing pin to the handle attachment plate, and a second link member pivotally connected to the first link member by a pivot pin.

8. The apparatus of claim 7, wherein said securing pin has a central axis, said pivot pin has a pivot pin axis, and wherein said securing pin central axis is offset from the pivot pin axis.

9. The apparatus of claim 7, wherein said second link member comprises a pair of parallel plates, between which a portion of the first link member is sandwiched.

10. The apparatus of claim 7, wherein a locking pin is carried by a free end of the second link member, said locking pin moving between a first position, extending through said peripheral ring and preventing rotation of said outer door and a second position retracted from the peripheral ring, allowing rotation of the outer door.

11. The apparatus of claim 1, wherein said outer door is pivotally and rotationally movable in relation to the exterior end of the vessel.

12. The apparatus of claim 11, wherein said outer door carries a reinforcement plate for securing the outer door for a pivotal movement at the exterior end of the vessel.

13. The apparatus of claim 12, wherein a movement limiting pin is attached to the outer door, said reinforcement plate being provided with an arcuate slot, and wherein said movement limiting pin is adapted for movement within said arcuate slot when the outer door is rotated.

14. The apparatus of claim 12, wherein said outer door is adapted for a limited rotational movement in relation to said reinforcement plate.

15. The apparatus of claim 14, wherein said outer door is provided with at least one handle for imparting rotational movement on said outer door.

16. The apparatus of claim 1, wherein said inner door is provided with an O-ring fitted in a peripheral groove formed on an inside surface of the inner door for sealing engagement with the inner end of the vessel.

17. The apparatus of claim 1, wherein said inner door carries a means for pivotal attachment of the inner door at the interior end of the vessel and a latch-engaging bar for engagement with the second latch means.

18. The apparatus of claim 17, wherein said second latch comprises an inner door latching assembly comprising an inner door latch member and a compression spring normally urging the inner door latch member in a locking engagement with the latch-engaging bar.

19. The apparatus of claim 18, wherein said inner door latching assembly further comprises an inner door latch base secured at the interior end of the vessel, said inner door latch base being pivotally attached to the inner door latch member.

20. The apparatus of claim 19, wherein said inner door latch member comprises a first slanted portion and a second portion oriented at an angle in relation to the first slanted portion, and wherein said latch-engaging bar is positioned between the second portion of the inner door latch member and an adjacent end of the inner door latch base.

21. The apparatus of claim 19, wherein said inner door latch base is provided with a hook-shaped portion for engaging with the latch engaging bar of the inner door.

22. The apparatus of claim 16, wherein said inner door has a peripheral edge and a central portion, and wherein said O-ring is fitted in the groove formed in the peripheral edge.

23. The apparatus of claim 22, wherein said inner door has a pre-determined thickness, and wherein the peripheral edge has a reduced thickness in relation to thickness of the central portion, such that an inwardly facing shoulder is formed between an inside surface of the peripheral edge and an inside surface of the central portion, said inwardly facing shoulder facilitating alignment of the inner door with the interior end of the vessel.

24. The apparatus of claim 23, wherein the interior end of the vessel is defined by a sidewall having a reduced thickness facilitating alignment of the inner door with the interior end of the vessel.

25. The apparatus of claim 1, wherein said third latch further comprises a compression spring normally urging the piston into a retracted position and moving the safety lock pin out of engagement with the peripheral ring.

26. An interlock assembly for use with decompression chambers, comprising:

an air tight vessel provided with one opening at each of the vessel ends and a sidewall extending between opposing ends of the vessel, said sidewall being provided with a peripheral shoulder-forming ring secured at an exterior end of the vessel;

an outer door mounted at the exterior end of the vessel, said door being adapted for a limited rotational and pivotal movement in relation to the exterior end of the vessel; an inner door mounted at an interior end of the vessel, said inner door selectively communicating with the decompression chamber when the inner door is open;

a first latch mounted at the exterior end of the vessel for selectively locking the outer door in a sealed engagement with the exterior end of the vessel, said first latch allowing the outer door to move between a locked position and a plurality of selectively open positions, said first latch comprising at least one sliding lock pin for preventing rotational movement of the outer door;

a second latch mounted at the interior end of the vessel for selectively locking the inner door in a sealed engagement with the inner end of the vessel;

a pressure relief valve operationally connected to the first latch for rapidly venting pressure inside the vessel when the first latch is moved to an open position; and wherein the outer door carries a reinforcement plate for securing the outer door for a pivotal movement at the exterior end of the vessel, and wherein a movement limiting pin is attached to the outer door, said reinforcement plate being provided with an arcuate slot, and wherein said movement limiting pin is adapted for movement within said arcuate slot when the outer door is rotated.

27. The apparatus of claim 26, wherein said outer door has an inwardly facing surface and an outwardly facing surface, and wherein an O-ring is fitted in a groove formed in the inwardly facing surface for sealing engagement with the peripheral ring.

28. The apparatus of claim 26, wherein said first latch comprises at least one latching assembly mounted on the sidewall of the vessel and engageable with the peripheral ring.

29. The apparatus of claim 28, wherein said at least one latching assembly comprises a handle, a handle attachment plate secured to the handle, and a linking means for selectively engaging the peripheral ring and preventing rotational movement of the outer door in relation to the exterior end of the vessel.

30. The apparatus of claim 29, wherein said attachment plate is secured to a valve member for opening and closing the pressure relief valve.

31. The apparatus of claim 29, wherein said linking means comprises a first link member pivotally secured by a securing pin to the handle attachment plate, and a second link member pivotally connected to the first link member by a pivot pin.

32. The apparatus of claim 31, wherein said securing pin has a central axis, said pivot pin has a pivot pin axis, and wherein said securing pin central axis is offset from the pivot pin axis.

33. The apparatus of claim 31, wherein said second link member comprises a pair of parallel plates, and wherein the first link member is sandwiched between the parallel plates.

34. The apparatus of claim 31, wherein said at least one lock pin is carried by a free end of the second link member, said lock pin moving between a first position, extending through said peripheral ring and preventing rotation of said outer door and a second position retracted from the peripheral ring and allowing rotation of the outer door.

35. The apparatus of claim 26, wherein the outer door is adapted for a limited rotational movement in relation to the reinforcement plate.

36. The apparatus of claim 29, wherein said outer door is provided with at least one handle for imparting rotational movement on said outer door.

37. The apparatus of claim 29, wherein said inner door is provided with an O-ring fitted in a peripheral groove formed on an inside surface of the inner door for sealing engagement with the inner end of the vessel.

38. The apparatus of claim 29, wherein said inner door carries a means for pivotal attachment of the inner door at the interior end of the vessel and a latch-engaging bar for engagement with the second latch.

39. The apparatus of claim 38, wherein said second latch comprises an inner door latching assembly comprising an inner door latch member and a compression spring normally urging the inner door latch member in a locking engagement with the latch-engaging bar.

40. The apparatus of claim 39, wherein said inner door latching assembly further comprises an inner door latch base secured at the interior end of the vessel, said inner door latch base being pivotally attached to the inner door latch member.

41. The apparatus of claim 39, wherein said inner door latch member comprises a first slanted portion and a second portion oriented at an angle in relation to the first slanted portion, and wherein said latch-engaging bar is positioned between the second portion of the inner door latch member and an adjacent end of the inner door latch base.

42. The apparatus of claim 39, wherein said inner door latch base is provided with a hook-shaped portion for engaging with the latch engaging bar of the inner door.

43. The apparatus of claim 37, wherein said inner door has a peripheral edge and a central portion, and wherein said O-ring is fitted in the groove formed in the peripheral edge.

44. The apparatus of claim 43, wherein said door has a pre-determined thickness, and wherein the peripheral edge has a reduced thickness in relation to thickness of the central portion, such that an inwardly facing shoulder is formed between an inside surface of the peripheral edge and an inside surface of the central portion, said inwardly facing shoulder facilitating alignment of the inner door with the interior end of the vessel.

45. The apparatus of claim 43, wherein the interior end of the vessel is defined by a sidewall having a reduced thickness facilitating alignment of the inner door with the interior end of the vessel.

46. The apparatus of claim 26, further comprising a second latch operationally connected to said vessel for preventing rotational movement of the outer door before pressure inside the vessel is equalized with pressure outside of the vessel.

47. The apparatus of claim 46, wherein said second latch comprises a piston chamber in air communication with the inside of the vessel, a piston slidably moveable inside the piston chamber, and a safety lock pin operationally connected to the piston and engageable with the peripheral ring to prevent rotational movement of the outer door.

48. The apparatus of claim 47, wherein said second latch further comprises a compression spring normally urging the piston into a retracted position and moving the safety lock pin out of engagement with the peripheral ring.

* * * * *